May 29, 1956   L. E. MOBERLY   2,748,300
CARBON BRUSHES FOR DYNAMOELECTRIC MACHINES
Filed April 21, 1955

Impregnated with Partially
Polymerized Diallyl Phthalate

Partially Polymerized
Diallyl Phthalate   Silicone Insulation

Partially Polymerized
Diallyl Phthalate

Silicone Insulation

WITNESSES

INVENTOR
Lawrence E. Moberly
BY
ATTORNEY

United States Patent Office 2,748,300
Patented May 29, 1956

2,748,300

CARBON BRUSHES FOR DYNAMOELECTRIC MACHINES

Lawrence E. Moberly, Plum Township, Allegheny County, Pa., assignor to Westinghouse Electric Corporation, East Pittsburgh, Pa., a corporation of Pennsylvania Application April 21, 1955, Serial No. 502,760

7 Claims. (Cl. 310—228)

The invention relates, generally, to carbon brushes for dynamoelectric machines and, more particularly, to treated carbon brushes capable of operating in contaminated atmospheres.

The object of the invention is to provide for protecting carbon brushes to enable their use in machines having conductors insulated with silicone compositions.

It is also an object of the invention to provide in association with carbon brushes materials which will prevent deleterious action of atmospheres contaminated with silicones.

Other objects of the invention will, in part, be obvious and will, in part, appear hereinafter.

The invention, accordingly, comprises an article of manufacture possessing the features, properties and the relation of elements which will be exemplified in the article hereinafter described, and the scope of the application of which will be indicated in the claims.

For a fuller understanding of the nature and objects of the invention, reference should be had to the following detailed description taken in connection with the accompanying drawing, in which.

Figure 1:
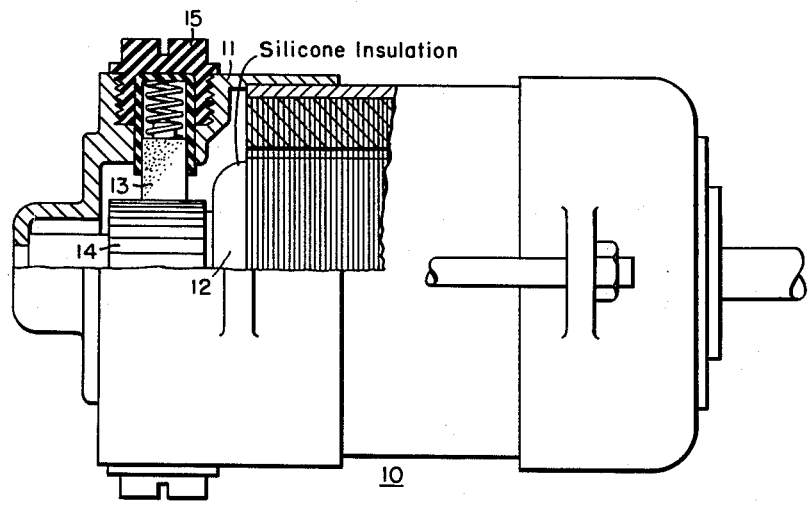
Figure 1 is a view partly in side elevation and partly in section of a dynamoelectric machine having a closed case showing the disposition of a carbon brush which has been treated in accordance with the teachings of the invention.

Referring now to the drawing and Fig. 1 in particular, a dynamoelectric machine shown generally at 10 having a closed case 11 and a silicone insulation 12 on the windings is provided with a carbon brush 13. In this particular embodiment of the invention, the carbon brush is disposed to ride on the commutator 14 or a slip ring of copper or other suitable metal. As is usual practice, the carbon brush is mounted in a threaded plug 15 to facilitate its removal for replacement purposes.

It has been found that when carbon brushes and silicone insulation or compositions of silicones are utilized together in dynamoelectric machines having closed cases that the life of the ordinary carbon brush is short. During the operation of the machine, the brush seems to deteriorate and is rapidly worn by contact with the commutator and disintegrates by dusting.

It appears that the atmosphere in the closed case is contaminated in some way by a silicone compound in the form of a vapor. The atmosphere contaminated with a silicone vapor is retained in the closed case of the dynamoelectric machine and, as a result, decreases the life of the carbon brush very materially. In fact, it has been found in tests that it sometimes lowers the life of the carbon brush to less than one-tenth of its normal operating life in similar machines having other types of insulation.

It has been found that this deterioration of the carbon brush in machines carrying silicones may be prevented by the use of partially polymerized diallyl phthalate. When a quantity of partially polymerized diallyl phthalate is either embodied in the brush or disposed so as to be exposed to the atmosphere in the closed case of a dynamoelectric machine that it counteracts the effect of the atmosphere contaminated with silicones. The partially polymerized diallyl phthalate contains monomeric diallyl phthalate and relatively volatile low polymers, such as the dimer, trimer, and so on.

In treating brushes with diallyl phthalate, the following process has been found to be quite successful. The brush is placed in a container and evacuated. A mixture of diallyl phthalate monomer plus four per cent benzol peroxide catalyst is then drawn into the container in sufficient quantity to cover the carbon brush. Air is then admitted to the container until pressure is atmospheric and the diallyl phthalate and catalyst enter the pores of the brush. When adequately drained the brush is given a heat treatment to partially polymerize the diallyl phthalate. First the brush is subjected to 80° C. for 16 hours, then to 135° C. for 5 hours, and 150° C. for four hours. However, it will be readily appreciated that other treatments may be worked depending on the degree of polymerization desired or other specifications to be met. In no circumstance will the diallyl phthalate be completely polymerized.

Figure 2:
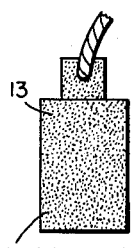
Fig. 2 is a view in side elevation of a carbon brush embodying the features of the invention.

The brush 13 illustrated in Fig. 2 was impregnated with partially polymerized diallyl phthalate. Tests made on brushes impregnated in this manner and mounted in closed machines, such as illustrated in Fig. 1, have given as long and sometimes better life than untreated brushes operated in atmospheres not contaminated by the presence of silicones. Diallyl phthalate monomer apparently is the active agent which counteracts the effects of silicone vapors on brush performance. The monomer, without any degree of polymerization, could be used as an agent either in brushes or in some part of a totally enclosed silicone insulated machine to obtain satisfactory protection for the brushes. However, in order to control the rate at which diallyl phthalate monomer is supplied to the atmosphere inside the totally enclosed unit, I prefer to use partially polymerized diallyl phthalate, applied in the manner described hereinbefore.

It has been found desirable in the use of partially polymerized diallyl phthalate that it be disposed so that it is heated to a temperature above atmospheric. In using brushes embodying diallyl phthalates in dynamoelectric machines, they are heated by a rise in temperature of the machine to a temperature that will result in effective operation. By effective operation I mean that the partially reacted diallyl phthalate is caused to give off vapors or products which neutralize the deleterious effect that the vapors or products given off by the silicone insulation or compositions of silicones in the case 11 have on the carbon brushes.

Figure 3:
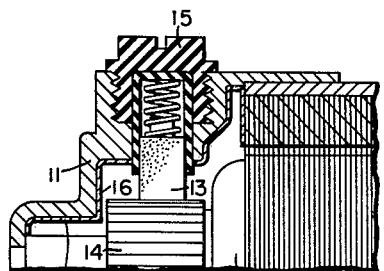
Fig. 3 is a view in section of a portion of a dynamoelectric machine showing the disposition of a carbon brush and the material for protecting the brush when it operates in a contaminated atmosphere.

Referring now to the modification illustrated in Fig. 3, it was found satisfactory to apply the partially reacted diallyl phthalate monomers to a part or all of the inner surface of the closed case 11. As shown, the partially polymerized diallyl phthalate 16 is applied to the case in close proximity to the brush 13 and the commutator 14. As illustrated, the partially reacted diallyl phthalate monomers are applied in a layer 16. There will be sufficient temperature rise in the machine to render effective the diaellyl phthalate.

Figure 4:
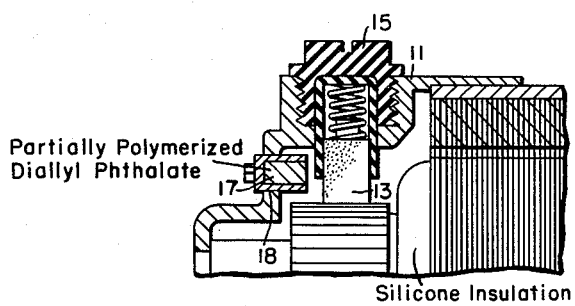
Fig. 4 is a modification of the invention shown in Fig. 3.

It will be appreciated that the diallyl phthalate may be employed in many forms. In the embodiments of the invention illustrated in Fig. 4, the diallyl phthalate monomers are prepared in the form of a plug 17, which is fitted into an opening 18 in the closed case 11. The advantages of using the diallyl phthalate in the plug in this manner are that it may be readily removed for replacement, and it may be disposed in a position close to the carbon brush 13 so as to counteract the deleterious effect of the atmosphere contaminated with silicones.

While all of the embodiments illustrated and described are utilized in connection with dynamoelectric machines having closed cases 11, tests reveal that the use of partially reacted diallyl phthalate monomers either embodied in or associated with carbon brushes in open machines having silicone insulation are also effective. They greatly prolong the life of the brush when operated in contaminated atmospheres. In fact, in some instances, they gave a life to the brush which was substantially normal.

Since certain changes may be made in the above product and different embodiments of the invention could be made without departing from the scope thereof, it is intended that all matter contained in the above description or shown in the accompanying drawing shall be interpreted as illustrative and not in a limited sense.

I claim as my invention:

1. In a dynamoelectric machine having a closed case and windings provided with silicone insulation which during operation of the dynamoelectric machine gives off silicone vapors, in combination, a carbon brush for conducting electrical current in cooperation with the windings, the brushes being disposed in the case and exposed to the silicone vapors, and a quantity of diallyl phthalate monomers in the case to react with the silicone vapors whereby the silicone vapors do not affect the carbon brushes.

2. In a closed dynamoelectric machine having windings provided with silicone insulation which gives off silicone vapors, in combination, a carbon brush conducting electrical currents in cooperation with the windings, the carbon brush being exposed to the silicone vapors, and a quantity of diallyl phthalate monomers carried by the carbon brush to counteract the deleterious action of the silicone vapors on the carbon brush.

3. In a closed dynamoelectric machine having windings provided with silicone insulation which give off silicone vapors, in combination, a carbon brush for conducting electrical current in cooperation with the windings, the carbon brush being exposed to the silicone vapors, and a quantity of diallyl phthalate monomers embodied in the brush by impregnation, the diallyl phthalate counteracting the deleterious action of the silicone vapors.

4. A carbon brush for use with dynamoelectric machines having windings insulated with silicones which give off silicone vapors comprising a porous carbon brush capable of carrying electrical current, a quantity of diallyl phthalate which has been partially polymerized but not beyond the stage where it no longer gives off monomer vapors, the brush being impregnated with such diallyl phthalate to react with the silicone vapors and protect the brush from the deleterious effect of such vapors.

5. A carbon brush for use with dynamoelectric machines having windings insulated with silicones which give off silicone vapors comprising a porous carbon brush capable of carrying electrical current, a quantity of diallyl phthalate which has been partially polymerized but not beyond the stage where it no longer gives off monomer vapors, the polymerized diallyl phthalate being embodied in the carbon brush, the diallyl phthalate serving to protect the brush from the deleterious effect of the silicone vapors.

6. In a dynamoelectric machine having a closed case and windings insulated with silicone which give off silicone vapors, in combination, a carbon brush disposed in the dynamoelectric machine for conducting current in cooperation with the windings, partially reacted diallyl phthalate monomers applied to the brush, the diallyl phthalate monomers reacting with the silicone vapors to protect the brush against the deleterious effect of silicone vapors.

7. In a dynamoelectric machine having a closed case and windings carrying silicone insulation which during operation contaminates the atmosphere in the case in combination, a carbon brush disposed in the dynamoelectric machine in the contaminated atmosphere, partially reacted diallyl phthalate monomers disposed in the case of the dynamoelectric machine in association with the brush, the partially reacted monomers serving to neutralize the deleterious action of the silicone contaminated atmosphere on the carbon brush.

No references cited.